(12) United States Patent
Murphy

(10) Patent No.: US 8,962,083 B2
(45) Date of Patent: Feb. 24, 2015

(54) MATERIAL FOR A BRAKE DISC

(75) Inventor: Martin Murphy, Winslow (GB)

(73) Assignee: Huntercombe Consultancy Limited, Winslow, Buckinghamshire (GB)

( * ) Notice: Subject to any disclaimer, the term of this patent is extended or adjusted under 35 U.S.C. 154(b) by 1304 days.

(21) Appl. No.: 11/916,363

(22) PCT Filed: Jun. 2, 2006

(86) PCT No.: PCT/GB2006/002010
§ 371 (c)(1),
(2), (4) Date: Dec. 3, 2007

(87) PCT Pub. No.: WO2006/129097
PCT Pub. Date: Dec. 7, 2006

(65) Prior Publication Data
US 2008/0199681 A1 Aug. 21, 2008

(30) Foreign Application Priority Data

Jun. 3, 2005 (GB) .................................. 0511376.6
Apr. 21, 2006 (GB) .................................. 0607931.3

(51) Int. Cl.
*B05D 3/00* (2006.01)
*B05D 3/02* (2006.01)
(Continued)

(52) U.S. Cl.
CPC ............. *C04B 41/87* (2013.01); *C04B 35/6269* (2013.01); *C04B 35/6309* (2013.01); *C04B 35/83* (2013.01); *C04B 41/009* (2013.01); *C04B 41/5048* (2013.01); *C23C 18/1204* (2013.01);
(Continued)

(58) Field of Classification Search
CPC ............. C04B 35/6306; C04B 35/6309; C04B 35/6269; C04B 41/009; C04B 41/5048; C04B 41/4505; C04B 41/4535; C04B 41/4539; C04B 41/5092; F16D 65/12; F16D 65/125
USPC .......... 427/226, 228, 294, 296, 379, 372, 375
See application file for complete search history.

(56) References Cited

U.S. PATENT DOCUMENTS 4,689,244 A * 8/1987 Lusk .............................. 427/601
4,902,326 A * 2/1990 Jarmon ........................... 65/442
(Continued)

FOREIGN PATENT DOCUMENTS

EP 0887326 12/1998
FR 2683813 5/1993
(Continued)

OTHER PUBLICATIONS

International Search Report, PCT/GB2006/002010, dated Sep. 21, 2006, 3 pages.
(Continued)

*Primary Examiner* — Michael Wieczorek
(74) *Attorney, Agent, or Firm* — Senniger Powers LLP

(57) ABSTRACT

A method for forming a material for a brake disc, the method comprising the steps of: (i) providing at least one porous body; (ii) introducing into pores of the porous body one or more precursor materials for forming or depositing a ceramic material; and (iii) forming the brake disc material by forming or depositing the ceramic material from the precursor material within the pores of the body, wherein the precursor material is a liquid containing a suspension of ceramic particles and/or acid phosphate.

30 Claims, 1 Drawing Sheet

(51) Int. Cl.

| | | |
|---|---|---|
| *C04B 41/87* | (2006.01) | |
| *C04B 35/626* | (2006.01) | |
| *C04B 35/63* | (2006.01) | |
| *C04B 35/83* | (2006.01) | |
| *C04B 41/00* | (2006.01) | |
| *C04B 41/50* | (2006.01) | |
| *C23C 18/12* | (2006.01) | |
| *C23C 26/00* | (2006.01) | |
| *C23C 30/00* | (2006.01) | |
| *F16D 69/02* | (2006.01) | |
| *C04B 111/00* | (2006.01) | |

(52) U.S. Cl.
CPC ................ *C23C 26/00* (2013.01); *C23C 30/00* (2013.01); *F16D 69/023* (2013.01); *C04B 2111/00362* (2013.01); *C04B 2235/3217* (2013.01); *C04B 2235/616* (2013.01); *F16D 2200/0047* (2013.01); *Y02T 50/67* (2013.01)
USPC ............................. 427/294; 427/296; 427/379

(56) References Cited

U.S. PATENT DOCUMENTS

| | | | |
|---|---|---|---|
| 5,281,439 A | | 1/1994 | Leluan et al. |
| 5,371,050 A | * | 12/1994 | Belitskus et al. ............ 501/95.2 |
| 5,686,144 A | * | 11/1997 | Thebault et al. .............. 427/282 |
| 5,725,955 A | * | 3/1998 | Tawil et al. ................... 428/408 |
| 5,962,135 A | | 10/1999 | Walker et al. |
| 6,071,603 A | * | 6/2000 | Sakai et al. ................ 428/304.4 |
| 6,302,246 B1 | * | 10/2001 | Naumann et al. ....... 188/218 XL |
| 6,455,159 B1 | | 9/2002 | Walker et al. |
| 6,561,269 B1 | | 5/2003 | Brown et al. |
| 6,668,984 B2 | * | 12/2003 | Gray .......................... 188/251 R |

FOREIGN PATENT DOCUMENTS

| | | | |
|---|---|---|---|
| GB | 2394221 A | | 4/2004 |
| JP | 6128051 | | 5/1994 |
| JP | 2000169845 A | | 6/2000 |
| WO | 8807506 A2 | | 10/1988 |
| WO | 9742135 A1 | | 11/1997 |
| WO | WO 9742135 A1 | * | 11/1997 |
| WO | 2004/011392 A1 | | 2/2004 |
| WO | 2004/076375 A2 | | 9/2004 |

OTHER PUBLICATIONS

Search Report, GB0607931.3, dated Jun. 12, 2006, 4 pages.
Written Opinion, PCT/GB2006/002010, dated Sep. 21, 2006, 5 pages.
Abstract of JP 2000169845; Jun. 20, 2000.
Abstract of JP 6128051; May 10, 1994.
Abstract of FR 2683813; May 21, 1993.
Arun et al., "Chemically Bonded Phosphate Ceramics: I, A Dissolution Model of Formation", Journal of the American Ceramic Society, Nov. 2003, pp. 1838-1844, vol. 86, No. 11.

\* cited by examiner

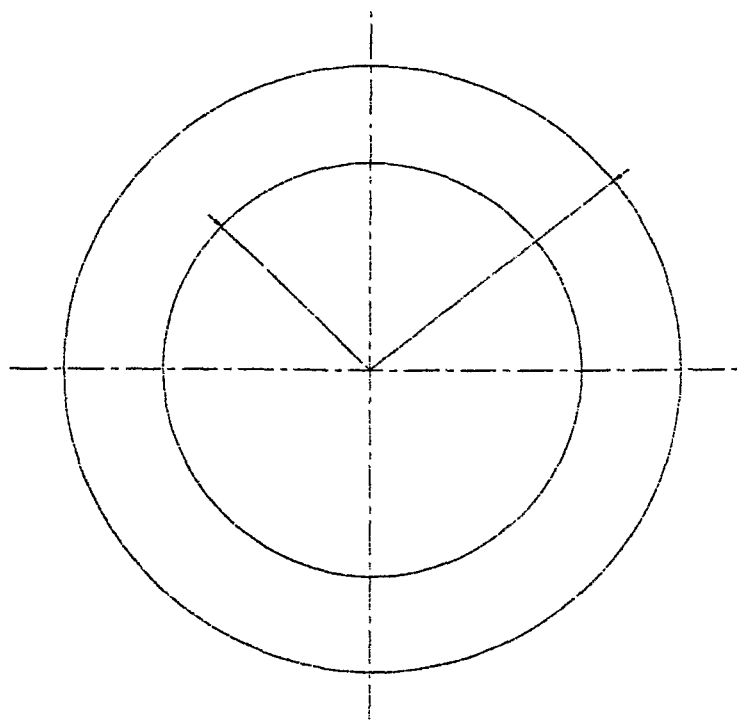

MATERIAL FOR A BRAKE DISC

The present invention relates to materials for use in friction components, particularly in brake discs or clutch plates.

Disc brakes comprising a caliper and a disc have been widely adopted, particularly for automotive applications. The disc is squeezed during braking between pads of friction material mounted in the caliper. The disc is mounted so that it rotates about an axis parallel to the axis of wheel rotation.

During use a brake disc will need to withstand considerable stresses, particularly shear, frictional and abrasive forces. A brake disc will often wear due to the abrasive forces over a period of time. It is of course desirable to produce a disc that is more resistant to wear than those currently available.

Brake discs that may be subjected to particularly high energy braking forces commonly contain some type of reinforcement, often carbon filaments in some form such as cloth, chopped fibre, woven fibres and the like. The primary purpose of such filaments is to impart high mechanical properties such as strength and rigidity at elevated temperature to the discs so that they can withstand the forces encountered during braking in high performance applications. Such applications are typically, but not exclusively, in the automotive and aerospace industries, for example in the braking systems of high performance sports cars, jet aircraft and the like. Brake discs may contain a carbon material, which may be in the form of a carbon-carbon (C/C) composite, e.g. a brake disc containing carbon cloth or filament layers contained within a Carbon matrix. (The term "carbon" is used in the generic sense and can mean any type of carbon, including either amorphous carbon or crystalline graphite). Additionally, brake discs have been made utilizing a bulk carbonaceous layer such as bulk graphite in order to reduce the long fabrication time of the C/C composite laminate and to reduce cost. Of course, brake discs have also utilized combinations of the C/C composite and bulk graphite layers.

In operation disc brakes can reach temperatures in excess of 1000° C. Such high temperatures lead to oxidation of the disc (the threshold for oxidation of carbon is approximately 1010° C. and many users set an upper operation limit of 800° C.) and results in high wear rates of both the friction and non-friction areas.

Various patent publications teach the coating of the non-friction regions of the disc to reduce oxidation and loss of mass from those areas. For example in GB 1544994 it is taught that coatings can be applied to the "non-wear" surface of C/C discs in order to provide an oxidation limiting coating.

Patent EP 0 548 196 teaches the application of a ceramic coating to a metallic substrate, preferably an aluminium metal matrix composite (MMC), the intention being to improve the temperature capability of the aluminium disc by the formation of a thermal barrier.

Patent application PCT/GB03/01783 teaches the application of a ceramic coating to the surface of a Carbon-Carbon brake.

U.S. Pat. No. 6,455,159 discloses the coating of aluminium phosphate-containing compositions (but specifically excluding monoaluminium phosphate-containing compositions) on carbon/carbon brake discs by brush painting, dipping, or other painting techniques.

International Patent Publication No. WO 2004/011392 discloses anti-oxidant coating compositions for coating carbon/carbon brake discs. This document indicates that it is undesirable to coat the friction surface of a brake disc with an anti-oxidant coating, since it decreases the "fitness of the brake for service", i.e. the friction properties of the working (or friction) surface are decreased when coated with the anti-oxidant coating.

The braking efficiency of coated brake disks is limited by the discrete nature of the coating and substrate materials at their interface. The interface between the coating and substrate has been found to be a plane of weakness limiting the effectiveness of these systems. Generally, it has been found that the application of the anti-oxidant coatings to a friction surface decreases the friction properties of the surface. A further drawback of coated brake discs is that the coating is removed during use to expose the underlying brake material of the brake, which can lead to increased oxidation of the friction surface on exposure to air. There is therefore a desire to produce a brake disc which is more resistant to oxidation than a standard carbon/carbon disc, but which would not show inferior braking performance to a standard carbon/carbon disc, preferably throughout the working lifetime of the disc.

Carbon/carbon brake discs are generally made by compressing a collection of carbon fibres together and forming the collection of fibres into a disc-shaped body (preform). In one method of manufacture the body is heated in a furnace containing organic gas such that Carbon is deposited on the fibres in the bulk of the preform (CVD/CVI process). In this way a carbon/carbon composite material is formed. The temperature at which the body must be heated is considerable and much energy and gas are used to produce a disc, the CVD process is sometimes repeated several times. There is therefore considerable time and cost involved in the production of a brake disc using this method. There is therefore a desire to produce a brake disc in a process that consumes less energy and takes less time.

In a first aspect, the present invention provides a method for forming a material for a brake disc, the method comprising the steps of:

(i) providing at least one porous body;

(ii) introducing into pores of the porous body one or more precursor materials for forming or depositing a ceramic material; and (iii) forming the brake disc material by forming or depositing the ceramic material from the precursor material within the pores of the body, wherein the precursor material is a liquid containing a suspension of ceramic particles and/or acid phosphate.

In a second aspect, the present invention provides a material for forming a brake disc comprising a porous body containing within its pores a ceramic material, wherein the ceramic material is present substantially throughout the porous body.

In a third aspect, the present invention provides a material for a brake disc formable by the method of the present invention.

In a fourth aspect, the present invention provides a material for a brake disc comprising a porous body containing within its pores one or more components selected from:

(i) a chemically bonded phosphate ceramic;

(ii) one or more ceramic materials which have been deposited within the pores from one or more liquid suspensions containing particles of one or more ceramic materials;

(iii) a ceramic material formable by depositing within the pores particles of an initial ceramic material from a liquid suspension and then reacting these particles with monoaluminium phosphate; and (iv) a ceramic material formable by vitrifying monoaluminium phosphate within the pores.

The chemically bonded phosphate ceramic may be formable in-situ by reactants introduced separately into the porous body.

In a fifth aspect, the present invention provides a brake disc comprising the material of the present invention.

In a sixth aspect, the present invention provides a multi-brake-disc stack comprising one or more brake discs comprising the material of the present invention. A "multi-brake-disc stack" is a collection of two or more brake discs. In this aspect, not all of the brake discs in the stack need to be of the material of the present invention.

For example, in this aspect of the invention alternate discs in the stack may contain the material of the present invention.

In a seventh aspect, the present invention provides a friction system comprising two engageable frictional components, wherein at least one of the components comprises a material of the present invention.

In the aspects above and the description below, "brake disc" may be replaced with "clutch plate". A brake disc and a clutch plate, in an automobile or other vehicle, must exhibit similar properties in that they both provide a rigid component against which another component, e.g. a brake pad or another clutch plate, must frictionally engage.

As a skilled person would appreciate, a clutch is a mechanical system for transmitting rotation in which one rotating object can be engaged and disengaged with another object, which can also rotate; these objects are typically clutch plates.

As mentioned above, in a first aspect, the present invention provides a method for forming a material for a brake disc, the method comprising the steps of:
(i) providing at least one porous body;
(ii) introducing into pores of the porous body a precursor material for forming or depositing a ceramic material; and
(iii) forming the brake disc material by forming or depositing the ceramic material from the precursor material within the pores of the body,
wherein the precursor material is a liquid containing a suspension of ceramic particles and/or acid phosphate.

Preferably, the precursor material is introduced substantially throughout the porous body. The porous body may have first and second surfaces on opposite sides of the porous body and the precursor material may be introduced into part of the porous body so that, in that part, the precursor material is present substantially throughout the body from first to second surfaces. This may be achieved by masking part of the first and/or second surfaces of the porous body before step (ii) to allow introduction of the precursor material into only part of the body, but allowing passage of the precursor material from the first surface to the second surface in that part. The porous body may have first and second surfaces on opposite sides of the porous body and the precursor material may be introduced into the porous body so that the precursor material is present substantially throughout the body from first to second surfaces.

The porous body may comprise one or more materials selected from carbon, silicon carbide and alumina. Preferably, prior to introduction of the ceramic material, the porous body comprises 50% or more, more preferably 90% or more, by weight of one or more materials selected from carbon, silicon carbide and alumina. The porous body may comprise a material for use in a brake disc and may be suitable for use as a brake disc prior to carrying out the method of the present invention. The porous body preferably comprises a carbon-carbon composite.

Preferably, in step (i), at least some of the pores in the porous body are interconnected to one another. Preferably, the pores in the interior of the body are interconnected to a free surface of the body. Such a body is termed a body having open interconnected porosity.

The porous body, in step (i), is preferably permeable to gases, and liquids such as water. The brake disc material need not be permeable to gases and/or water after formation or deposition of the ceramic material within its pores, but it may be permeable to gases and/or water if desired.

The porous body, in step (i), may be a rigid body. The porous body may be in the shape of a brake disc. The porous body may be in the shape of a ring. The porous body may comprise a material for use in a brake disc. The porous body may comprise carbon, preferably a carbon-carbon composite, a ceramic material or a metal, such as an aluminium alloy or steel. The porous body may comprise a foamed ceramic or foamed metal or those with a relatively high porosity content compared with conventional structural materials, or a combination thereof. Preferably, the porous body comprises a carbon-carbon composite.

The pores will preferably be of a size sufficiently large to allow ceramic particles of the precursor material through the porous body and preferably the porous material will contain pores having a diameter of at least 5 µm, more preferably at least 10 µm, still more preferably at least 100 µm, most preferably at least 300 µm. The infiltrated material can then penetrate from the free surface into the interior of the body.

The porous body, in step (i), may comprise a collection of particles and/or fibres, which preferably comprise carbon, preferably 50% or more by weight of carbon, more preferably 90% or more by weight of carbon, as measured prior to the introduction of the ceramic material into the porous body. The particles and/or fibres may be a loosely bound collection of particles and/or fibres, i.e. the particles/fibres are not chemically bonded together. Such a collection of particles or fibres would not be suitable for use without further processing as a material for a brake disc. In one aspect of the invention the porous body may be a "green body" compact, e.g. a body composed of loosely bonded particles and/or fibres that have been pressed or bonded together. The present inventors have found that by using the process of the present invention, the particles/fibres are adhered together and form a body suitable for use as a brake disc, i.e. it has sufficient durability under normal braking conditions to be used as a brake disc.

The amount of energy required to form the ceramic material from the precursor material has been found to be generally much less than in the methods of the prior art to form a carbon/carbon brake disc. The body formed using the method of the present invention has the advantage that it is much less prone to oxidation than the brake discs of the prior art. The braking properties of a brake disc formed using the method of the present invention are comparable and, surprisingly, often an improvement over the carbon/carbon brake discs of the prior art.

The body may comprise cloth comprising fibres, which may comprise carbon. The body may comprise layers of cloth.

The fibres preferably have an average cross-sectional diameter of from 3 to 20 µm. "Average diameter" is the arithmetic mean of the diameters of the fibres. The fibres are preferably arranged into tows. The fibres may be of any length or mixtures thereof. The fibres and/or tows may be in a woven or non-woven arrangement. The fibres may be sewn or otherwise arranged to make a three dimensional arrangement. The porous body may comprise a felt-like material comprising fibres, which preferably comprise carbon. "Felt-like material" means a material comprising non-woven, compressed fibres.

A "tow" is an untwisted collection of continuous fibres. A tow may contain many, e.g. hundreds or thousands, of fibres. The tow preferably contains 1000 fibres or more, more preferably 5000 fibres or more. Tows may be grouped together, preferably without twisting, and in this configuration are termed a "roving".

There is no limitation to the volume percentage of the porosity contained within the porous body. The porous body, in step (i), preferably has a porosity of from 5 to 40% by volume.

If the porous body comprises a cloth material, which may comprise carbon, then the aerial density of the porous body, in step (i), is preferably from 50 to 2500 g/sq m Aerial density is the weight of a material, typically cloth, per unit area and is typically expressed in g/sq m.

Preferably, the ceramic particles comprise a material selected from one or more of alumina, zirconia, magnesia, yttria, silicon carbide, silica, boron carbide, boron nitride, titanium boride, iron oxides and chromium oxides.

Preferably, the particles have a size of from 10 nm to 100 µm, more preferably 10 nm to 10 µm, most preferably, the ceramic particles have an average size of from 10 nm to 100 µm, more preferably of from 10 nm to 10 µm. Preferably, the ceramic particles have an average size of from 20 nm to 200 nm. The "size" of a particle indicates its largest cross-sectional diameter. The "average size" of the particles is the arithmetic mean diameter of the particles.

Preferably, the precursor material comprises a Sol of ceramic particles. A "Sol" is a colloid in which solid particles are dispersed in a liquid continuous phase (Oxford Dictionary of Chemistry, Fourth Edition 2000).

Preferably, the precursor material has a pH of from 0.5 to 7.0. Preferably, the precursor material has a pH of from 1 to 5.

Preferably, the precursor material comprises a polar solvent, more preferably water.

The precursor material may comprise 10 to 30% by weight of the ceramic particles. Preferably, the precursor material comprises of from 15 to 25% by weight of the ceramic particles.

The precursor material may be introduced into the pores of the porous body by one or more techniques selected from vacuum infiltration, immersion of the body at least partially into the precursor material, painting the body with the precursor material and spraying the porous body with the precursor material. Introduction of the precursor material into the porous body may be aided by the agitation of the porous body and precursor(s) using an ultrasonic treatment. Preferably, ultrasound waves having a frequency of from 20 to 400 KHz are applied, more preferably a frequency of from 35 to 80 KHz.

The ceramic particles of the precursor material are preferably deposited into the pores by means selected from one or more of electrically charging the porous body, freezing the porous body, introduction of an acidic or alkaline material and introducing into the pores a material containing particles having an opposite charge from the particles in the suspension.

To effect deposition of the ceramic particles, the porous body may be electrically charged to +/−3 V or more, preferably +/−10 to 50 V. The body may be electrically charged for a time of 1 minute or more, preferably, 5 minutes or more, preferably 10 minutes or more, most preferably from 10 to 45 minutes to allow the deposition of the ceramic particles to occur. The current density during deposition is dependent upon the surface area of the carbon fibres and the nature of the suspension. A compromise between deposition rate and evenness of deposition can be arrived at by simple experimentation.

Composite parts of the porous body, e.g. two or more layers of porous material, such as cloth, may be combined before or after deposition of the ceramic material.

The particles of the precursor material may be deposited in the presence of Yttria. Yttria, in the form of a sol, has been found to aid deposition of certain ceramic particles, in particular particles with a positive charge in suspension, such as alumina particles also suspended in a sol. Yttria has also been found to have the advantage of toughening the deposited ceramics, particularly when the particles are reacted, cured or vitrified by heating.

The particles of the precursor material may be assisted in depositing within the pores of the porous body by applying ultrasound to the porous body while the precursor material, e.g. a sol containing ceramic particles, is within the pores of the porous body. Preferably, ultrasound waves having a frequency of from 20 to 400 KHz are applied, more preferably a frequency of from 35 to 80 KHz.

The particles of the precursor material once deposited in the pores may be reacted, cured or vitrified to form the ceramic material.

The porous body may be moulded in to the shape of a brake disc in step (i), and/or during or after steps (ii) and/or (iii). Pressure may be applied to maintain the porous body in the shape of a brake disc during steps (ii) and/or (iii).

The ceramic material may be formed in the pores of the porous body by heating the body in step (iii), optionally after deposition of the ceramic particles and/or acid phosphate within the pores. The body may be heated for a first period at a temperature of 100 to 300° C., preferably for a period of 1 hour or more, and then optionally for a second period at a higher temperature, preferably of a temperature of from 350 to 370° C., preferably for a period of 1 hour or more.

Preferably, the acid phosphate comprises one or more of potassium acid phosphate, calcium acid phosphate, ammonium acid phosphate and aluminium acid phosphate.

Preferably, the acid phosphate comprises mono aluminium phosphate.

The acid phosphate may be vitrified within the pores of the porous body to form the ceramic material. The curing or vitrification of the acid phosphate may be in the absence of any other reactant, i.e. the acid phosphate alone may cure or vitrify.

Preferably, the precursor material contains a suspension of (i) ceramic particles and (ii) acid phosphate and/or phosphoric acid.

In the method of the present invention, a first precursor liquid containing a suspension of ceramic particles and a second precursor liquid containing acid phosphate and/or phosphoric acid may be introduced separately into the pores of the body. Preferably, the particles of the first precursor liquid are deposited in the pores of the porous body prior to introduction of the second precursor liquid. Preferably, the body is dried following deposition of the particles of the first precursor liquid in the pores and before introduction of second precursor liquid.

Preferably, the body is heated to react, cure or vitrify the deposited ceramic particles and the acid phosphate. Typical curing conditions can vary dependent on the acid phosphate used, but preferably the body is heated for a first period of 1 to 2 hours at a low temperature (e.g. 100 to 130° C.) and then for a second period at a higher temperature (e.g. 350 to 370° C.).

The acid phosphate may react in the pores in the presence of a metal oxide to form the ceramic material, which comprises a chemically bonded phosphate ceramic.

The metal oxide may be a divalent or trivalent metal oxide.

The metal oxide preferably comprises one or more of aluminium oxide, calcium oxide, iron oxide, magnesium oxide and zinc oxide.

The present invention provides a porous body containing within its pores a chemically bonded phosphate ceramic.

The present invention also provides a method for the manufacture of a porous body, which may be as defined herein, the method comprising:
 forming the chemically bonded phosphate ceramic in situ in the pores of the porous body.

"Chemically bonded phosphate ceramic" is a term of the art and includes materials formed from a reaction between an acid phosphate and a metal oxide. Chemically bonded phosphate ceramics and their methods of synthesis are illustrated in a paper entitled Chemically Bonded Phosphate Ceramics, by S. Y. Jeong and A. S. Wagh, published in Materials Technology, June 2002. The content of this paper, particularly its method of synthesis of magnesium phosphate ceramics, aluminium phosphate ceramics and iron phosphate ceramics, are incorporated herein by reference. An "acid phosphate" is a chemical species comprising a phosphate ion and at least one hydrogen ion, e.g. $HPO_4^{2-}$. The acid phosphate will normally further include a metal ion. Mono aluminium phosphate has the formula $Al(H_2PO_4)_3$.

The chemically bonded phosphate ceramic may partially or completely fill some or all of the pores of the porous body.

Preferably, the chemically bonded phosphate ceramic comprises a chemically bonded divalent or trivalent metal phosphate ceramic. A "chemically bonded metal phosphate ceramic" is a chemically bonded phosphate ceramic comprising the said metal, which may be formed from the acid phosphate of the said metal. Preferably, the chemically bonded phosphate ceramic comprises one or more of a chemically bonded magnesium phosphate ceramic, a chemically bonded calcium aluminate phosphate ceramic, a chemically bonded zinc phosphate ceramic, a chemically bonded aluminium phosphate ceramic and a chemically bonded iron phosphate ceramic. Particularly preferred is a chemically bonded aluminium phosphate ceramic, preferably formed from a reaction between aluminium oxide (alumina) and aluminium hydrogen phosphate.

The chemically bonded phosphate ceramic may contain further materials, preferably ceramic materials, which may be in the form of a powder. In the method of manufacturing the porous body as defined herein, these further materials and the precursors to the chemically bonded phosphate ceramics may be introduced into the porous body either separately or in combination with each other. These further materials may contribute to the physical or mechanical properties of the material but are not necessarily reactants in the formation of CBPCs although they may be physically interlocked with the CBPC. Preferably but not exclusively these further materials comprise ceramics such as aluminium oxide, silicon carbide, silica, magnesium oxide, boron carbide, boron nitride, titanium boride, yttria, iron oxides and chromium oxides, or any combination thereof.

Most preferably, the body comprises a carbon material, more preferably a carbon-carbon composite, and the body contains a chemically bonded aluminium phosphate ceramic within its pores.

The body preferably has a porosity of 5-40% by volume, the porosity being measured prior to the introduction of the chemically bonded phosphate ceramic into or formation of the chemically bonded phosphate ceramic in the pores.

The present invention further provides a brake disc comprising a porous body as defined herein.

As mentioned above, the present invention provides a method for the manufacture of a porous body containing within its pores a chemically bonded phosphate ceramic, as defined herein, the method comprising:
 forming the chemically bonded phosphate ceramic in situ in the pores of the porous body.

The reagents and reaction conditions for making the chemically bonded phosphate ceramic may be as disclosed in the paper entitled Chemically Bonded Phosphate Ceramics, by S. Y. Jeong and A. S. Wagh, published in Materials Technology, June 2002. Within this paper the reaction between sparingly soluble metal oxides and acid phosphates is described and illustrated by means of examples of the most common reactions studied thus far.

The chemically bonded phosphate ceramic is formed from precursors, these precursors preferably comprising an acid phosphate and a metal oxide. The precursors may be in water, either as a solution or a suspension.

Preferably, the acid phosphate comprises one or more of potassium acid phosphate, calcium acid phosphate, ammonium acid phosphate and aluminium acid phosphate. Aluminium acid phosphate (aluminium hydrogen phosphate) is particularly preferred.

The metal oxide is preferably a divalent or trivalent metal oxide, more preferably a sparingly soluble metal oxide. The metal oxide preferably has a solubility product, $pK_{sp}$, in water of from 10 to 50. The metal oxide may comprise one or more of aluminium oxide, calcium oxide, iron oxide, magnesium oxide and zinc oxide. Aluminium oxide is particularly preferred.

The metal oxide may be in solution and/or in the form of a suspension of solid particles in a liquid, as herein described.

If a divalent metal oxide is used, e.g. magnesium oxide, preferably the divalent metal oxide is calcined, preferably at a temperature of about 1300° C. or above so that its grains are well crystallized and micropores from the grains are substantially removed. This reduces the solubility of the divalent metal oxide, particularly magnesium oxide, to a level at which improved yields of the chemically bonded phosphate ceramic are obtained.

If aluminium oxide is used, preferably the reaction to form the chemically bonded phosphate ceramic is carried out at a raised temperature, preferably at a temperature of from 100 to 200° C., more preferably of from 118° C. to 170° C., most preferably at about 150° C. This raises the solubility of the aluminium oxide so that the yield of the chemically bonded phosphate ceramic is improved.

If $Fe_2O_3$ is used as a trivalent metal oxide, preferably a small amount of elemental iron is used, since this reduces the trivalent iron to divalent iron, improves the overall solubility of iron in solution and thus improves the yield of the chemically bonded phosphate ceramic.

The precursors to the chemically bonded phosphate ceramic may further comprise one or more of silicon carbide, silica, boron carbides, boron nitrides and titanium borides. The precursors may also further comprise deflocullants or retardant materials such as boric acid.

The acid phosphate may constitute less than 40% by weight of the total mass of the precursors to the chemically bonded phosphate ceramic.

Preferably, the body has open interconnected porosity and the precursors to the chemically bonded phosphate ceramic are introduced into at least some of the interconnected pores of the porous substrate prior to the formation of the chemically bonded phosphate ceramic in the pores.

At least two of, and possibly all of, the precursors to the chemically bonded phosphate ceramic may be mixed together and the resultant mixture then introduced into the pores of the porous body prior to the formation of the chemically bonded phosphate ceramic. The precursors may be the acid phosphate and the metal oxide.

At least two, and possibly all of, the precursors to the chemically bonded phosphate ceramic may be introduced into the pores of the porous body separately. For instance, the acid phosphate and metal oxide may be introduced separately.

The precursors may be cured by the application of heat to form or strengthen the chemically bonded phosphate ceramic.

The precursors to the chemically bonded phosphate ceramic may be introduced into the pores of the porous body by one or more of: spraying the porous body with the precursors; dipping the porous body into a mixture of the precursors; painting the porous body with the precursors; vacuum infiltration of the precursors into the porous body and pressure infiltration of the precursors into the porous body. Preferably, the precursors are introduced by first spraying the precursors onto at least one surface of the porous body and then drawing the precursors into the interior of the body by vacuum infiltration.

The present invention provides a porous body containing a chemically bonded phosphate ceramic within its pores, the body formable by the methods as defined herein.

The present invention further provides the use of a porous body as defined herein as a friction material for example for use as a brake disc or clutch plate; or as a structural component for use at elevated temperatures for example for use as a heat shield; engine components; oven furniture; kiln furniture; metal-, glass- or ceramic-processing equipment; heater components; or light fittings.

The present invention further provides the use of a porous body as defined herein in a brake disc.

A combination of two or more different types of chemically bonded phosphate ceramics (CBPC's) may be present in the pores of the porous body.

The properties of the porous body containing the CBPC in its pores will be dependent on the amount of CPBC in the pores and the constitution of the CPBC. The amount and content of CPBC may be determined according to the properties desired in the resultant porous body.

The precursors are preferably in a form so that they have sufficient fluidity to infiltrate the porous body (this is also dependent on the method of infiltration), for instance in solution and/or a fine suspension in a solvent, such as water. As mentioned above, the material may also contain deflocullants, dispersing agents and other additives designed to optimize fluidity and stability as is well known to those skilled in the art of controlling aqueous suspensions of fine powders. The dispersing agent may be from the Dispex series of dispersing agents manufactured by CIBA.

The size fraction of the metal oxides is selected to optimize incorporation into the porous body and the speed and extent of the CBPC reaction. If the infiltrated material is composed of several different metal oxides, each powder may be of a different size fraction; similarly if a single metal oxide is used, the metal oxide may comprise powders of two or more different size fractions.

The term "carbon" is used in the generic sense and includes either amorphous carbon or crystalline graphite.

Following infiltration the entire body may be cured using a heating cycle appropriate to the particular CBPC reaction or combination of reactions being used and optimized for the particular combination of particulates and powders used in the infiltrated mixture. Alternatively, the CBPC may be cured at room temperature (e.g. 20° C.) or below room temperature, including freezing processes.

Preferably, the surface of the body has a fine surface finish, and preferably has a mean surface roughness above 5 microns Rz. Preferably, the surface of the body has mean surface roughness of less than 30 microns Rz. Preferably, the mean surface roughness is from 5 to 30 microns Rz. The surface finish may be altered using techniques known to those skilled in the art.

The surface of the discs may also be finished by techniques such as grooving, cutting or drilling the discs, as is known to those skilled in the art in order to improve braking performance. The degree of impregnation can be controlled in different parts of the disc by processes such as masking and hence the thermal energy flow within the disc can be varied.

In the method of the present invention, preferably step (iii) forms a brake disc.

In a second aspect, the present invention provides a material for forming a brake disc comprising a porous body containing within its pores a ceramic material, wherein the ceramic material is present substantially throughout at least a portion of the porous body. If the porous body is in the shape of a disc having first and second opposing surfaces in the plane of the disc, the ceramic material may, in at least a portions of the disc (or optionally in the entire disc) be present substantially throughout the disc from the first to the second surfaces. In other words, when a cross section is taken through that portion of the porous body, the ceramic material will be seen to be present throughout that portion from the first to the second surface, preferably in a substantially consistent concentration (in mass of ceramic material per unit volume of the porous body, e.g. g/cm$^3$), for example preferably the concentration of ceramic material does not vary by more than 20% from the first surface to the second surface. Preferably, in a portion of the disc where the ceramic material is present at or just below the first and second surfaces, the concentration of ceramic material for a given cubic centimetre (or more preferably a unit volume of 125 mm) at any point between the first and second surface of the porous body in that portion of the disc is not zero. In preparing such a disc, various parts of the disc may be masked during the synthesis process to prevent infiltration of the ceramic material into the disc.

"Substantially throughout the porous body" includes, but it is not limited to, a porous body having less than 3 mm between pores containing the ceramic material, preferably less than 2 mm, most preferably less than 1 mm, between pores containing the ceramic material.

The advantage of the ceramic material being present at a fairly consistent concentration in the pores of the body from the first to the second surface is that, in use, the wear and/or frictional properties of the body remain relatively constant as the frictional surface (i.e. the first or second surface) of the body is worn away in use.

In a third aspect, the present invention provides a material for a brake disc formable by the method of the present invention.

In a fourth aspect, the present invention provides a material for a brake disc comprising a porous body containing within its pores one or more components selected from:
(i) a chemically bonded phosphate ceramic;
(ii) a ceramic material which has been deposited within the pores from one or more liquid suspensions containing particles of one or more ceramic materials;

(iii) a ceramic material formable by depositing within the pores particles of an initial ceramic material from a liquid suspension and then reacting these particles with monoaluminium phosphate; and (iv) a ceramic material formable by vitrifying monoaluminium phosphate within the pores.

(v) a chemically bonded phosphate ceramic material formable in-situ by reactants introduced separately into the porous body.

In a fifth aspect, the present invention provides a brake disc comprising the material of the present invention.

The present invention also provides a clutch plate comprising the material of the present invention. Only a portion of the clutch plate may comprise the material of the present invention. The clutch plate may have first and second surfaces on opposite sides of the plate and, in at least a portion of the plate, the material of the present invention may be present substantially throughout the portion of the plate from the first to the second surface, in an analogous manner to the brake disc described above.

In a sixth aspect, the present invention provides a multi-brake-disc stack comprising one or more brake discs comprising the material of the present invention. A "multi-brake-disc stack" is a collection of two or more brake discs. In this aspect, not all of the brake discs in the stack need to be of the material of the present invention. For example, in this aspect of the invention alternate discs in the stack may contain the material of the present invention.

In a seventh aspect, the present invention provides a friction system comprising two engageable frictional components, wherein at least one of the components comprises a material of the present invention. One component may be a brake disc and the other component may be a brake pad, said brake disc comprising a material of the present invention. Alternatively, one or both components is/are a clutch plate.

Both engageable frictional components may comprise a material of the present invention or only one of the engageable frictional components may comprise a material of the present invention. Preferably, one or both engageable frictional components have a mean surface roughness of 30 microns Rz or less, preferably on the surface with which one component engages with the other component.

The brake pad may comprise material that is not a material of the present invention. The brake pad may comprise a conventional brake pad material, which may include materials such as abrasives, e.g. alumina or silicon, lubricants, e.g. graphite or a sulphide, loads, elastomers, metals, polymeric fibres and bonding resins. The one or more brake pads may each be mounted in a caliper in a conventional manner.

If the body is or forms part of a brake disc, various aspects of the performance of the disc can be enhanced by controlling the surface finishing operations carried out on the disc. In particular the co-efficient of friction, initial bite and bedding-in of the discs can all be enhanced by producing a disc with a fine surface finish (preferably a mean surface roughness of 30 microns Rz or less, preferably from 5 to 30 microns Rz). Preferably at least the wear surfaces of the disc have a fine surface roughness, preferably of from 5 to 30 microns Rz. The mean surface roughness is measured according to the Rz ISO standard, which is also termed the "Ten Point Average Roughness". The mean surface roughness is calculated by averaging the height of the five highest peaks and the depth of the five lowest valleys over the measuring length, using an unfiltered profile.

It has been found that a brake disc produced according to the invention can be used with brake pads made from a variety of different materials including organic, organo-metallic, carbon-metallic, carbon-ceramic and carbon-carbon and other brake pads known to those skilled in the art. Carbon-carbon brake pads suitable for use on the unprocessed disc (untreated disc) are preferred. Clearly different pad materials give a different braking response that may or may not be desirable.

Components that can be made using the porous body of the present invention include brake discs and similar friction products, heat shields, engine components, oven or kiln furniture, metal-, glass- or ceramic-processing equipment, heater components, light fittings and other high temperature structural components.

Most preferably the invention is a brake disc comprising a porous body as defined herein, wherein the body comprises a Carbon-Carbon composite and has a chemically bonded aluminium phosphate ceramic within its pores.

The porous body may also be used to form other components for use in environments where the component will be subjected to high stresses and/or high temperatures. Such components can be parts for use in the automotive (including Heavy Goods Vehicles), aerospace, railway, machine tool, medical or construction industries.

The invention will now be illustrated by means of the following non-limiting Examples.

EXAMPLES

Example 1

Example 1 illustrates the formation of a chemically bonded aluminium phosphate ceramic within the pores of a standard Carbon-Carbon brake disc. Precursors are first infiltrated into the pores of the disc prior to the formation of the chemically bonded phosphate ceramic. The infiltrated disc has superior performance compared with the standard disc tested under identical conditions.

This Example uses a ventilated Carbon-Carbon disc as used on a Formula One car and manufactured by Carbon Industrie. One may use any other type of Carbon-Carbon brake, including non-ventilated discs.

The mixture to be infiltrated was composed of 65% (by weight) Alumina powder (F600) and an acidic aqueous solution of Mono Aluminium Phosphate ($Al(H_2PO_4)_3$) made up to a pH between 0.60 and 1.0. These constituents were mixed together and sprayed onto the friction surfaces of the disc so that there was an excess of mixture present. The remainder of the disc was then masked with air-tight plastic so that a vacuum could be drawn through the vent holes within the disc (used for cooling when the disc is in operation on a car). On the application of a vacuum (<250 Torr) to this arrangement the mixture was drawn from the surface into the bulk of the disc. The vacuum was applied for a total of 10 min. The excess residue was cleaned off in water. Following infiltration and cleaning the entire component was then cured using the following heating cycle: 1 hr at 100° C.; raise to 370° C. at 135° C. per hour and hold at 370° C. for a further hour.

The discs were finished to a mean surface roughness of 10 microns Rz, measured according to the Rz ISO standard.

Discs made using the above method were tested on a brake dynamometer at Brake Testing International Ltd in Hinckley, UK. The discs were tested using an inertia of 16.67 Kg.Sqm, an applied torque of 1000 Nm and a speed reduction of 2400 rpm to 800 rpm. It was shown that after a total of 500 stops the thickness of the standard Carbon-Carbon disc had decreased by 1.62 mm whereas the thickness of the treated disc had decreased by only 0.62 mm. Thus, in this test the treated disc showed a reduction in wear of over 60% compared with the standard disc. The friction performance of the treated disc was comparable to the control disc.

Further tests were conducted on a similar disc infiltrated twice using the same parameters; the mean surface roughness of the disc was 10 Rz, measured according to the Rz ISO standard. The wear was measured over a shortened test duration of 25 stops using a higher inertia of 22.54 Kg.Sqm. The wear on the Carbon-Carbon control was measured as 0.21 mm and that of the treated disc as 0.02 mm. This is the equivalent of 4.2 mm and 0.4 mm over a projected 500 stop test sequence. Thus, in this test the treated disc showed a reduction in wear of over 90% compared with the standard disc.

It is to be noted that the variation of infiltration parameters can be used to produce a desired combination of disc wear and friction characteristics.

Example 2

Circles of carbon fibre cloth, 50 mm in diameter, were cut from material supplied by PRF Composites with the following specification. Aerial density approximately 450 g/sq m, bi-axial weave 45 deg 225 gsm and −45 deg 225 gsm stitched double ply-6K tow size CXOO9.

Two of these circles were immersed in a bath containing Alumina Sol The Alumina sol was NYACOL AL20 supplied by Nano Technologies Inc. The Sol contained 20% alumina by weight suspended in water with a particle size of 50 nm, pH of 4 and a positive charge.

The two circles were connected to an electrical circuit such that one of the circles was charged positively (anode) and the other negatively (cathode). A voltage of 12V was applied across the two electrodes for 10 min and a uniform deposit of Alumina gel was observed to form on the cathode. The cathode was removed from the apparatus and replaced with a fresh piece of Carbon cloth. The procedure was then repeated. The whole procedure was repeated five times to produce five pieces of carbon cloth impregnated with Alumina. These five pieces were then air dried overnight when they were observed to be touch dry.

The five dried pieces of Carbon cloth were sprayed and saturated with an aqueous solution of Aluminium mono Phosphate (43.0 wt %) and Phosphoric Acid (6.9 wt %). They were then placed one on top of the other to form a stack and placed in an aluminium mould of 50 mm diameter. The mould cavity was shorter in depth than the stack so that mechanical pressure could be applied to the stack of Carbon cloth by tightening bolts securing the lid to the body of the mould. The mould depth was 10 mm fully tightened.

The mould and stack were then heat treated; 1 hr at 100° C., 1 hr at 200° C., 1 hr at 300° C. and 1 hr at 400° C. and then allowed to furnace cool.

The finished component was extracted from the mould and subjected to a non-standard mechanical drop weight test from which comparable toughness to standard C/C was demonstrated.

Example 3

A brake disc was made by using Carbon fibre cloth and treating it separately with an Alumina SOL and a solution of Aluminium Mono Phosphate in Phosphoric Acid.

The Carbon cloth used in this Example was a plain weave with an aerial density of approximately 900 g/sqm. The average size of the fibres was 6-9 um with 48,000 fibres in each tow. The Carbon fibre cloth was supplied by Advanced Composites Group in the UK. The fibres were produced from a PAN source. The size on the Carbon fibres was removed by treating with acetone prior to use.

Rings with a 340 mm outside diameter and a 232 mm internal bore as shown in FIG. 1 were cut from the Carbon cloth. These were treated individually in the following manner. The ring of Carbon fibre (now referred to as the cathode) was clamped into a jig made of aluminium. Also contained within the jig were further upper and lower Carbon fibre rings (known as the anodes) of similar shape to the ring. The anodes were reused for each of the cathodes. The jigging was arranged such that the planes of the cathode and anodes were parallel and separated by 15 mm. The jig was connected to an electrical circuit such that the anode was charged positively and the cathode charged negatively.

The jig was submerged beneath the surface of an Alumina Sol. The particular Sol used was NYACOL AL20 supplied by Nano Technologies Inc. The Sol contained 20% alumina by weight suspended in water with a particle size of 50 nm, pH of 4 and a positive charge.

A voltage of 3V was applied between cathode and anode for a total of 30 min. An even distribution of Alumina was observed to be deposited over the surface of the anode.

The cathode was taken out of the Sol and dried for several hours at room temperature until touch dry.

The above procedure was repeated for five separate cathodes. These were then sprayed and saturated with an aqueous solution of Aluminium mono Phosphate (43.0 wt %) and Phosphoric Acid (6.9 wt %) and pressed lightly together. This so formed preform was placed in an aluminium tool and wrapped in a vacuum bag assembly in the manner commonly used for the manufacture of carbon fibre epoxy composites. The tooling was arranged such that on evacuation of the vacuum bag an even pressure was applied to the top and bottom surfaces of the preform.

The assembled tool and preform were then placed in an autoclave (90 psi) and heated at 100° C./hr to 105° C. and held at that temperature for an hour before being allowed to air cool.

The assembled preform and tool were then removed from the vacuum bagging and further heated at 135° C./hr to 370° C. and held at 370° C. for 4 hours. The assembly was then furnace cooled.

The finished preform was then removed from the tooling and machined to produce a finished brake disc.

The invention claimed is:

1. A method for forming a material for a brake disc, the method comprising the steps of:
 (i) providing at least one porous body;
 (ii) introducing into pores of the porous body one or more precursor materials for forming or depositing a ceramic material , wherein the precursor material is introduced throughout the porous body from first to second surfaces on opposite sides of the porous body ; and
 (iii) forming a brake disc material comprising said porous body and the ceramic material by a process comprising depositing the ceramic material from the precursor material within the pores of the porous body or forming the ceramic material from the precursor material within the pores of the porous body,
 wherein the precursor material is a liquid containing a suspension of ceramic particles and/or acid phosphate;
 wherein step (iii) of forming the brake disc material comprises an operation selected from the group consisting of:
  a) depositing the ceramic material from the precursor material within the pores of the porous body, wherein the precursor material is the liquid containing the suspension of the ceramic particles, and the ceramic particles are particles of the ceramic material, followed by heating the porous body to form the brake material comprising the porous body and the deposited ceramic material;
b) depositing the ceramic material from the precursor material within the pores of the porous body, wherein the precursor material is the liquid containing the suspension of the ceramic particles, and the ceramic particles are particles of the ceramic material, followed by vitrifying the ceramic particles to form the brake material comprising the porous body and the deposited ceramic material;
c) forming the ceramic material from the precursor material within the pores of the porous body, wherein the precursor material is the liquid containing the suspension of the acid phosphate, followed by curing or vitrifying the acid phosphate in the absence of any other reactant;
d) forming the ceramic material from the precursor material within the pores of the porous body, wherein the precursor material is the liquid containing the suspension of the ceramic particles and the acid phosphate, followed by curing or vitrifying the ceramic particles and the acid phosphate in the absence of any other reactant; and
e) forming a chemically bonded phosphate ceramic by reacting the acid phosphate with a metal oxide wherein the precursor material is the liquid containing the suspension of the acid phosphate and further containing the metal oxide.

2. A method as claimed in claim 1, wherein the porous body comprises one or more materials selected from carbon, silicon and alumina.

3. A method as claimed in claim 1, wherein, in step (i), the porous body comprises a collection of fibres, which comprise carbon.

4. A method as claimed in claim 1, wherein the ceramic particles comprise a material selected from one or more of alumina, zirconia, magnesia, yttria, silicon carbide, silica, boron carbide, boron nitride, titanium boride, iron oxides and chromium oxides.

5. A method as claimed in claim 1, wherein the precursor material comprises a Sol of ceramic particles.

6. A method as claimed in claim 1, wherein the precursor material is introduced into the pores of the porous body by one or more techniques selected from vacuum infiltration, immersion of the porous body at least partially into the precursor material, painting the porous body with the precursor material and spraying the porous body with the precursor material.

7. A method as claimed in claim 1, wherein the ceramic particles of the precursor material are deposited into the pores by one or more means selected from electrically charging the porous body, freezing the porous body, introduction of an acidic or alkaline material and introducing into the pores a material containing particles having an opposite charge from the particles in the suspension.

8. A method as claimed in claim 1, wherein in step (ii) and/or step (iii) the porous body and the precursor material are exposed to an ultrasonic treatment.

9. A method as claimed in claim 1, wherein the acid phosphate comprises one or more of potassium acid phosphate, calcium acid phosphate, ammonium acid phosphate and aluminum acid phosphate.

10. A method as claimed in claim 1, wherein the acid phosphate comprises mono aluminum phosphate.

11. A method as claimed in claim 1, wherein step (iii) or subsequent treatment forms a brake disc from the brake disc material.

12. A method as claimed in claim 11, wherein the mean surface roughness of the brake disc so formed is 30 microns Rz or less.

13. A method as claimed in claim 1, the method comprising
in step (i) providing two or more porous bodies and placing the porous bodies together to form a combined porous body; and
carrying out steps (ii) and (iii) on the combined porous body to form the material for a brake disc.

14. A method as claimed in claim 13 wherein, in step (iii), the combined porous body forms a multi-brake-disc stack.

15. A method as claimed in claim 1, the method comprising
providing two or more porous bodies and placing the porous bodies together to form a combined porous body, which may be a multi-brake disc stack, wherein at least one of the porous bodies contains within its pores a ceramic material.

16. The method of claim 1 wherein the forming the brake disc material comprises the (a) depositing the ceramic material from the precursor material within the pores of the porous body, wherein the precursor material is the liquid containing the suspension of the ceramic particles, and the ceramic particles are particles of the ceramic material, followed by heating the body.

17. The method of claim 16 wherein the brake disc material formed by the heating consists essentially of the porous body and the deposited ceramic materials from the precursor in the porous body.

18. The method of claim 1 wherein the forming the brake disc material comprises the (b) depositing the ceramic material from the precursor material within the pores of the porous body, wherein the precursor material is the liquid containing the suspension of the ceramic particles, and the ceramic particles are particles of the ceramic material, followed by vitrifying the ceramic particles.

19. The method of claim 18 wherein the brake disc material formed by the vitrifying consists essentially of the porous body and the deposited ceramic materials from the precursor in the porous body.

20. The method of claim 1 wherein the forming the brake disc material comprises the (c) forming the ceramic material from the precursor material within the pores of the porous body, wherein the precursor material is the liquid containing the suspension of the acid phosphate, followed by curing or vitrifying the acid phosphate in the absence of any other reactant.

21. The method of claim 20 wherein the brake disc material formed by the curing or vitrifying consists essentially of the porous body and phosphate ceramics formed in the absence of any other reactant in the porous body.

22. The method of claim 1 wherein the forming the brake disc material comprises the (d) forming the ceramic material from the precursor material within the pores of the porous body, wherein the precursor material is the liquid containing the suspension of the ceramic particles and the acid phosphate, followed by curing or vitrifying the ceramic particles and the acid phosphate in the absence of any other reactant.

23. The method of claim 22 wherein the brake disc material formed by the curing or vitrifying consists essentially of the porous body, the deposited ceramic materials from the precursor, and phosphate ceramics formed in the absence of any other reactant in the porous body.

24. The method of claim 1 wherein the forming the brake disc material comprises the (e) forming a chemically bonded phosphate ceramic by reacting the acid phosphate with a metal oxide wherein the precursor material is the liquid containing the suspension of the acid phosphate and further containing the metal oxide.

25. The method of claim 24 wherein the brake disc material formed by the reaction of the acid phosphate with the metal oxide and the curing or vitrifying consists essentially of the porous body and chemically bonded phosphate ceramics formed in the porous body.

26. A method as claimed in claim 24, wherein the metal oxide comprises one or more of aluminum oxide, calcium oxide, iron oxide, magnesium oxide and zinc oxide.

27. The method of claim 1 wherein the formed brake disc material is a disc wherein the concentration of ceramic material does not vary by more than 20% from the first surface to the second surface.

28. The method of claim 1 wherein the formed brake disc material is a disc wherein the concentration of ceramic material is not zero in any cubic centimeter of volume between the first and second surfaces.

29. A method for forming a material for a brake disc, the method comprising the steps of:

(i) providing at least one porous body;
(ii) introducing into the pores of the porous body one or more precursor materials for forming or depositing a ceramic material; and
(iii) forming the brake disc material comprising the porous body and the ceramic material by a process comprising forming the ceramic material from the precursor material within the pores of the porous body, wherein the precursor material comprises a first precursor liquid containing a suspension of ceramic particles and a second precursor liquid containing acid phosphate and/or phosphoric acid, followed by curing or vitrifying the ceramic materials and the acid phosphate in the absence of any other reactant, wherein the precursor material is introduced substantially throughout the porous body from first to second surfaces on opposite sides of the porous body.

30. A method as claimed in claim 29, wherein the particles of the first precursor liquid are deposited in the pores of the porous body prior to introduction of the second precursor liquid.

* * * * *